(12) United States Patent  
Jeon et al.

(10) Patent No.: US 8,363,983 B2  
(45) Date of Patent: Jan. 29, 2013

(54) REAL-TIME FACE DETECTION APPARATUS

(75) Inventors: Jae Wook Jeon, Suwon-si (KR); Seung Hun Jin, Suwon-si (KR); Dong Kyun Kim, Suwon-si (KR); Tuong Thuy Nguyen, Suwon-si (KR); Dai Jin Kim, Pohang-si (KR); Mun Sang Kim, Seoul (KR)

(73) Assignee: Sungkyunkwan University Foundation for Corporate Collaboration, Suwon-Si (KR)

( * ) Notice: Subject to any disclaimer, the term of this patent is extended or adjusted under 35 U.S.C. 154(b) by 1015 days.

(21) Appl. No.: 12/389,533

(22) Filed: Feb. 20, 2009

(65) Prior Publication Data

US 2010/0202703 A1    Aug. 12, 2010

(30) Foreign Application Priority Data

Feb. 9, 2009    (KR) .................. 10-2009-0010019

(51) Int. Cl.
*G06K 9/32* (2006.01)
*G06K 9/00* (2006.01)
*G06K 9/68* (2006.01)

(52) U.S. Cl. .................. 382/298; 382/118; 382/218

(58) Field of Classification Search .................. 382/118, 382/209, 217, 218, 293, 298
See application file for complete search history.

(56) References Cited

U.S. PATENT DOCUMENTS

| | | | |
|---|---|---|---|
| 7,050,607 B2 * | 5/2006 | Li et al. | 382/118 |
| 7,512,286 B2 * | 3/2009 | Luo | 382/286 |
| 7,515,739 B2 * | 4/2009 | Porter et al. | 382/118 |
| 7,689,034 B2 * | 3/2010 | Terakawa | 382/159 |
| 7,783,086 B2 * | 8/2010 | Sabe et al. | 382/118 |
| 8,055,029 B2 * | 11/2011 | Petrescu et al. | 382/118 |

FOREIGN PATENT DOCUMENTS

| | | |
|---|---|---|
| KR | 1020060055064 | 5/2006 |
| KR | 1020080079798 | 9/2008 |

* cited by examiner

*Primary Examiner* — Yon Couso
(74) *Attorney, Agent, or Firm* — Lexyoume IP Meister, PLLC.

(57) ABSTRACT

Disclosed herein is a real-time face detection apparatus. The real-time face detection apparatus includes a down-scaling unit and a face region comparison unit. The down-scaling unit down-scales an input image at at least one ratio. The face region comparison unit creates a plurality of windows for the image down-scaled at the at least one ratio, acquires face region confidence of each of window images within the created windows by comparing the window image with a classifier, and determines whether the window image corresponds to a face region.

10 Claims, 7 Drawing Sheets

REAL-TIME FACE DETECTION APPARATUS

CROSS-REFERENCE TO RELATED APPLICATION

This application claims priority to and the benefit of Korean Patent Application No. 10-2009-0010019 filed in the Korean Intellectual Property Office on Feb. 9, the entire contents of which are incorporated herein by reference.

BACKGROUND OF THE INVENTION

1. Field of the Invention

The present invention relates generally to a real-time face detection apparatus, and, more particularly, to a face detection apparatus for detecting the positions and sizes of one or more faces in an image, captured by a camera, by analyzing the captured image using a window in real time.

2. Description of the Related Art

In the case where a general image processing scheme is used, captured faces have a variety of sizes and shapes. Face detection under various limitations to, for example, the position of a face and illumination, can be implemented using a relatively simple method. In images captured in a general environment, faces are variously deformed according to the environment. The environment makes it difficult to detect faces in the captured images.

Furthermore, a person may exist at one of various positions with respect to a camera placed at a specific position. Accordingly, this results in a change in the size of a face in an input image. In order to detect the face, it should be determined whether a region having a variable size is a face region or not. This determination is not easy in general image processing methods.

In order to solve this problem, P. Viola and M. Jones proposed a method of constructing specific classifiers based on facial features, dividing the specific classifiers into weak classifiers at a plurality of levels, and performing face detection using strong classifiers, which are combinations of the weak classifiers. In particular, a small number of classifiers are assigned to the early stage of the strong classifiers, and a large number of classifiers are assigned to the later stage of the strong classifiers, so that both the detection speed and performance are improved compared to those of the prior art.

However, this method is also performed sequentially based on software, so that in order to detect faces having various sizes, images must be sequentially scaled and face detection must be performed on the scaled images based on respective strong classifiers, with the result it is generally difficult to process images necessary for image processing in real time.

SUMMARY OF THE INVENTION

Accordingly, the present invention has been made keeping in mind the above problems occurring in the prior art, and an object of the present invention is to provide a real-time face detection apparatus, which is capable of detecting faces having various sizes in real time based on all images by simultaneously creating images at different scales and applying classifiers to the respective created images in parallel.

In order to achieve the above object, the present invention provides a real-time face detection apparatus, including a down-scaling unit for down-scaling an input image at at least one ratio, and a face region comparison unit for creating a plurality of windows for the image down-scaled at the at least one ratio, acquiring face region confidence of each of window images within the created windows by comparing the window image with a classifier, and determining whether the window image corresponds to a face region.

The classifier may be implemented using a look-up table, including pixel-based confidence value information for a specific number of pixels which belong to the pixels of a window having a specific size.

The face region comparison unit may acquire face region confidence of each of the window images by comparing each of the window images with respective classifiers at a plurality of stages.

If a sum of confidence values of pixels of each of the window images, information of which exists in a look-up table, satisfies a preset criterion, the face region comparison unit may proceed to a subsequent stage.

If a sum of confidence values of pixels of the window image, information of which exists in a look-up table at a final stage, satisfies a preset criterion, the face region comparison unit may determine the window image to be a face region.

As the face region comparison unit proceeds to a higher stage, the look-up table may include pixel-based confidence value information for a larger number of pixels which belong to pixels of the window image.

The real-time face detection apparatus may further include a face detection unit for detecting one of the plurality of window images, which are determined to be the face regions by the face region comparison unit, as a final face region window image.

The face detection unit may calculate a sum of confidence values of each of the window images, which are determined to be the face regions, at the respective stages, and then detects the final face region window image using the calculated sum.

The face region comparison unit may receive two or more down-scaled images having different clock cycles based on down-scaled ratios, and determine whether the received two or more down-scaled images are face regions during a specific clock cycle.

The face region comparison unit may determine whether two or more down-scaled images for which a sum of down-scaled ratios is 1 are face regions.

The face region comparison unit may receive two or more down-scaled images having a same clock, and determine whether the received two or more down-scaled images are face regions during the clock cycle using valid flags of the down-scaled images.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENT

An embodiment of the present invention will be described in detail with reference to the accompanying drawings.

Figure 1:
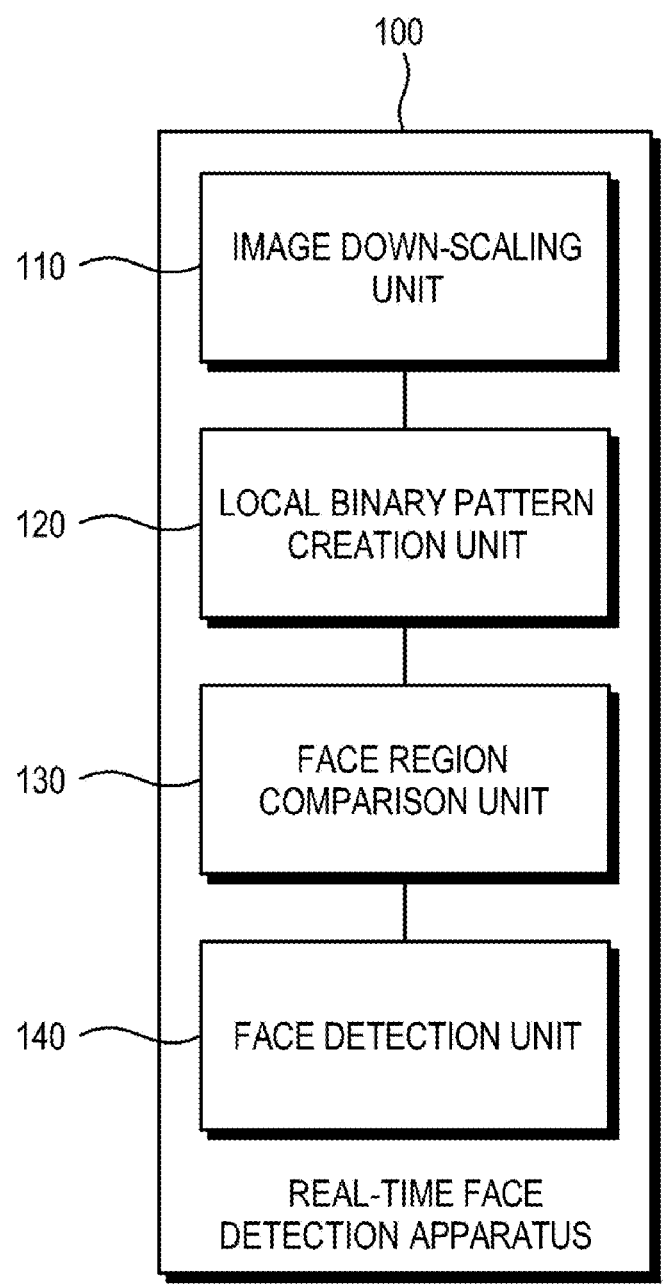
FIG. 1 is a block diagram showing the construction of a real-time face detection apparatus according to an embodiment of the present invention.

FIG. 1 is a block diagram showing the construction of a real-time face detection apparatus 100 according to an embodiment of the present invention.

The real-time face detection apparatus 100, as shown in FIG. 1, may include an image down-scaling unit 110, a local binary pattern creation unit 120, a face region comparison unit 130, and a face detection unit 140.

The image down-scaling unit 110 is used to downscale the size of a screen at a specific ratio so that the size of a subject's face, which varies depending on the distance between a camera (not shown) and the subject, can be processed within a window having a specific size.

For example, in the case where a 20×20 window is used for face detection, the size of a face which can be detected is set to a size of 20×20. However, in the case where the distance between a camera and a subject's face is short, there is a high probability of the entire face image not being included in the 20×20 window. In order to prepare for this case, a face image is downscaled so that the entire face is included in the 20×20 window.

In this case, it is difficult to know the ratio at which the entire face image must be downscaled so that the entire face can be included in a window having a specific size. Furthermore, to reduce images to a preset window size is more efficient than to perform the learning of a reference image on all faces having various sizes from the points of view of storage space and detection performance. Accordingly, in order to detect faces having various sizes, the real-time face detection apparatus 100 according to the present invention performs downscaling at at least one ratio.

In the case where down-scaling is performed at a plurality of ratios, there is the difference in the resolution between down-scaled images. Accordingly, in the case where face detection is performed using the same clock, blanks which do not use a pixel- or line-based clock are generated. The real-time face detection apparatus 100 according to the present invention may use blanks not using the clock in order to reduce the use of the hardware of the face region comparison unit 13 by face learning data.

The local binary pattern creation unit 120 compares the brightness value of each pixel of each image, acquired by the image down-scaling unit 110, with the brightness value of each pixel neighboring the corresponding pixel. If, as a result of the comparison, the pixel value of each pixel neighboring the corresponding pixel is greater than that of the corresponding pixel, the local binary pattern creation unit 120 calculates the corresponding pixel value as 1. If, as a result of the comparison, the pixel value of each pixel neighboring the corresponding pixel is smaller than that of the corresponding pixel, the local binary pattern creation unit 120 calculates the corresponding pixel value as 0.

Since the number of pixels neighboring the corresponding pixel is 8, a specific code having an 8-bit length can be created. Here, it is preferred that such an 8-bit code be sequentially created in a uniform direction from one of neighboring pixels other than a corresponding pixel. Since the sequence of combination of the created bits is determined in a process of acquiring learning data, the local binary pattern creation unit 120 creates a bit stream according to a process of acquiring corresponding learning data.

Figure 4:
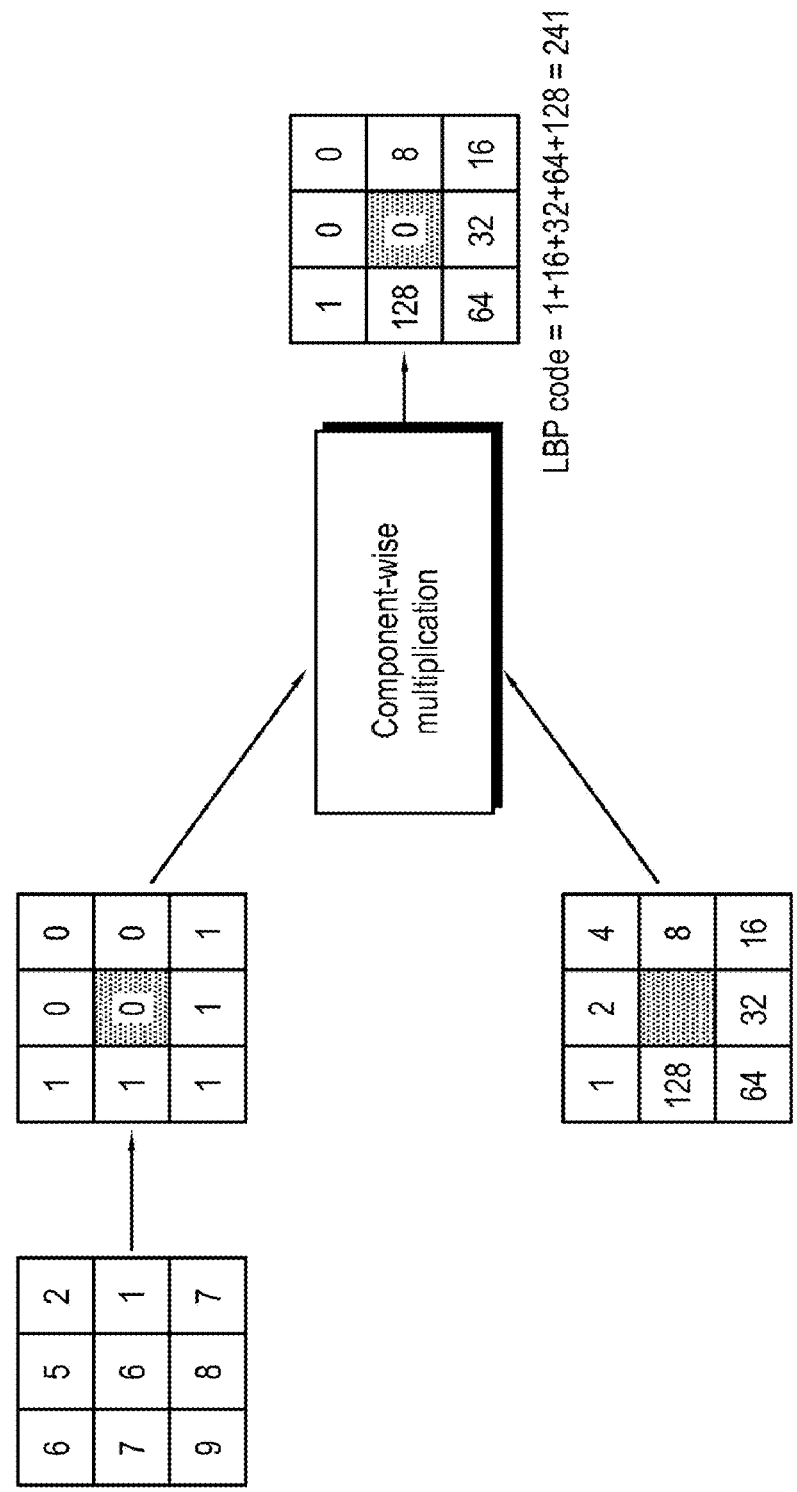
FIG. 4 is a diagram showing a method by which the real-time face detection apparatus creates a local binary pattern for an input image according to the present invention.

In the case where pixels are present as shown in FIG. 4, the value of an 8-bit code acquired for a center pixel is "11110001." This code can be expressed as 241 in the decimal system. Here, the 8 bits, which correspond to the length of a binary pattern, may have the same brightness values as the pixels of a general gray image. Accordingly, in a subsequent process, a configuration of a type in which images having only pixel values replaced with respective local binary pattern values are received in the state where the images having only pixel values have the same format as the received images is possible.

$$LBP(X_c, Y_c) = \sum_{0}^{7} 2^i f(v_i - v_c) \quad (1)$$

$$f(x) = \begin{cases} 1 \text{ if } x \geq 0 \\ 0 \text{ if } x < 0 \end{cases}$$

Meanwhile, the face region comparison unit 130 receives the local binary pattern image of a down-scaled image, and creates a window having a specific size. The window having a specific size sequentially processes the received local binary pattern image. The face region comparison unit 130 determines whether an image included in the window is a face region by comparing the image with a classifier created based on the learning data.

In the face region comparison unit 130 of the real-time face detection apparatus 100 according to the present invention, a window is implemented based on a register, and is configured to access the pixels of the corresponding window at the same time. This configuration enables face confidence values for all pixels within a window to be calculated at the same time.

In this case, the classifier is implemented in the form of a look-up table. The look-up table includes pixel-based confidence value information for some of pixels that belong to a window having a specific size.

For example, a look-up table at stage 1 may include pixel-based confidence value information for 9 pixels in a 20×20 window. The face region comparison unit 130 at the stage 1 reads 9 pixel values at respective positions defined in the look-up table of the created window, and acquires confidence values corresponding to the respective pixel-based pixel values. The face region comparison unit 130 adds the 9 pixel-based confidence values together. If, as a result of the addition, the sum of confidence values is equal to or greater than a reference value (equal to or less than), the face region comparison unit 130 determines that the created window may include a face region and then proceeds to a subsequent stage (for example, stage 2).

In the case of an image that has passed through the final stage, the sum of confidence values acquired by respective face region comparison units at respective states is the final face confidence value of a corresponding image area.

The look-up table requires a register having a specific size, and requires a space of about 300 KB in the construction of a strong classifier covering a plurality of stages.

In the present invention, it is most preferable to implement strong classifiers corresponding to down-scaled images at all stages from the point of view of speed. This is described later with reference to FIG. 6.

Furthermore, a later classifier (at a higher stage) has a relatively low reference frequency because reference is made to only images that have passed all classifiers. In contrast, an early classifier (a previous stage t a lower stage) has a relatively high reference frequency.

On the basis of this characteristic, the image down-scaling unit 101 may implement face region comparison units using parallelism together with serialization in the sequence from a higher reference frequency to a lower reference frequency using pixel- or line-based blanks caused by the difference in the resolution between down-scaled images. This will be described later with reference to FIG. 5.

The face detection unit 140 detects a face region using the final face confidence value, obtained by the face region comparison unit 130, and the down-scaling ratio of a down-scaled image having the corresponding face confidence value.

In particular, the same face region may be repeatedly detected while the window moves across an input image. With regard to the face regions repeatedly detected as described above, it is preferable to select an image area having the highest final face confidence value or the lowest final face confidence value as a final face region based on learning data.

Figure 2:
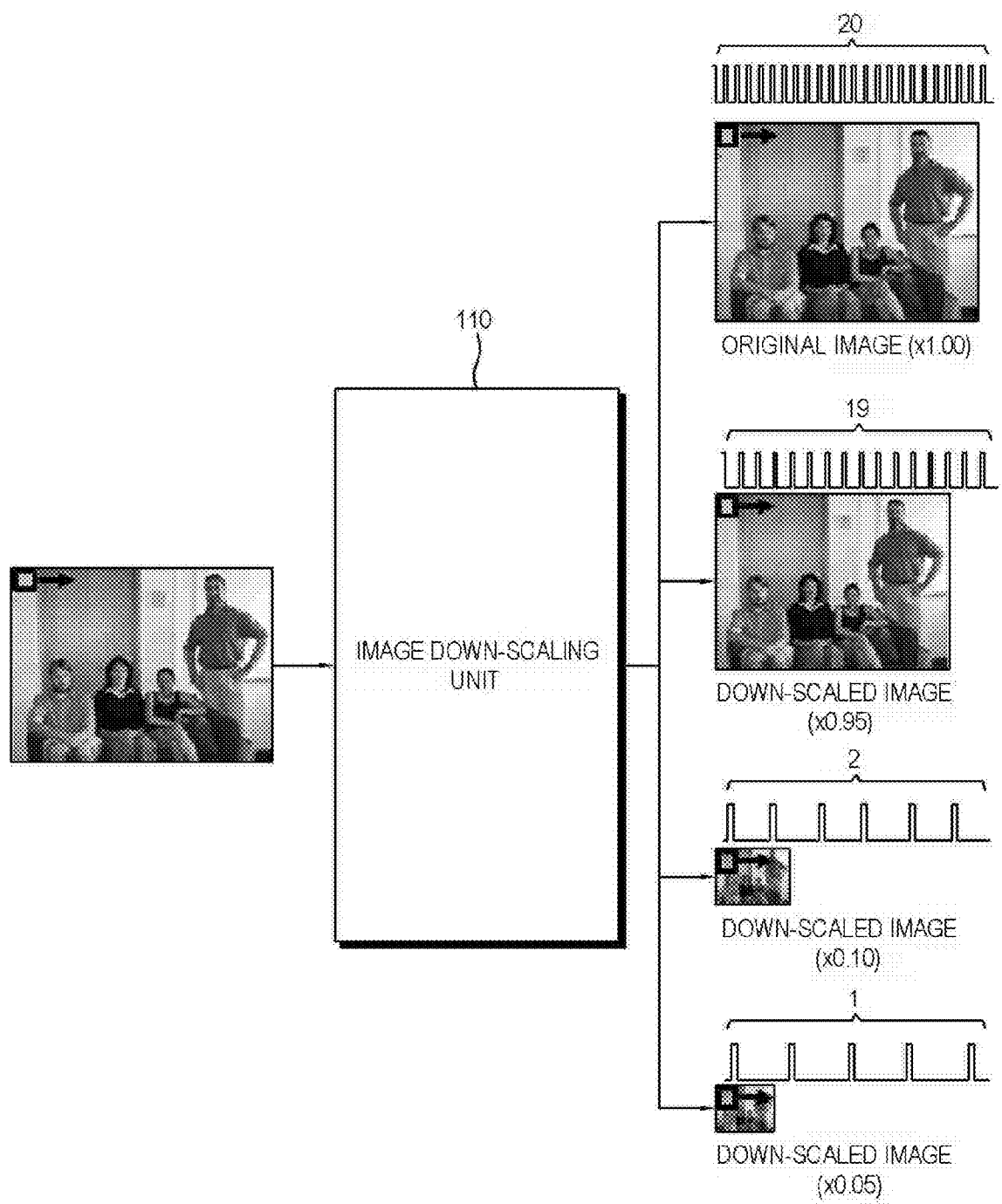
FIG. 2 is a diagram showing a first method by which the real-time face detection apparatus creates down-scaled images according to the present invention.

FIG. 2 is a diagram showing a first method by which the real-time face detection apparatus creates down-scaled images according to the present invention.

In FIG. 2, an input image has a scaling ratio of 1.00. The image down-scaling unit 110 down-scales the original image at a plurality of ratios, thereby acquiring a plurality of down-scaled images.

FIG. 2 illustrates images that are acquired by down-scaling an original image at ratios of 1:0.95, 1:0.10, and 1:0.05. In the case where the number of clock cycles necessary to process an original image during period 't' is 20, the number of clock cycles necessary to process the image acquired through down-scaling at a ratio of 1:0.95 is 19, the number of clock cycles necessary to process the image acquired through down-scaling at a ratio of 1:0.10 is 2, and the number of clock cycles necessary to process the image acquired through down-scaling at a ratio of 1:0.05 is 1.

The real-time face detection apparatus according to the present invention uses the difference in the number of clock cycles caused by the difference in resolution between the down-scaled images as described above. This will be described later in greater detail with reference to FIG. 5.

Figure 3:
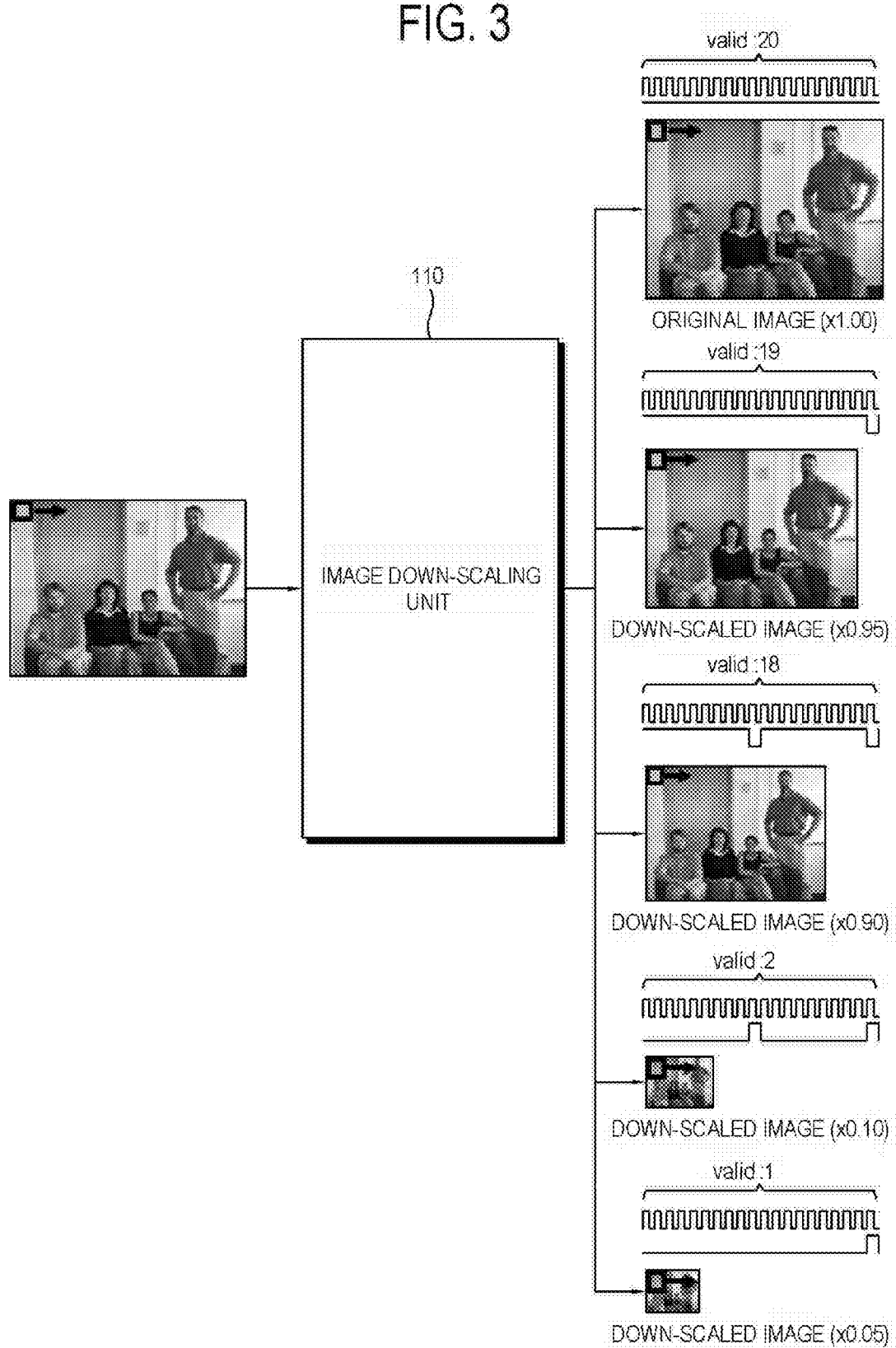
FIG. 3 is a diagram showing a second method by which the real-time face detection apparatus creates down-scaled images according to the present invention.

FIG. 3 is a diagram showing a second method by which the real-time face detection apparatus creates down-scaled images according to the present invention.

In FIG. 2, a plurality of down-scaled images has been created using clocks having different cycles. That is, in FIG. 2, the numbers of clock cycles necessary to process the respective down-scaled images differ.

In FIG. 3, however, the number of clock cycles necessary to process respective down-scaled images is the same. The ratios of the down-scaled images may be distinguished using respective valid flags, indicating that valid image data exists among a plurality of regions included in one clock cycle.

An original image has 20 valid flags during one clock cycle. Down-scaled images at ratios of 1:0.95, 1:0.10 and 1:0.05, shown in FIG. 3 have the same clock cycle as the original image. However, the three images have 19 valid flags, 2 valid flags, and 1 valid flag during one clock cycle.

As described above, the image down-scaling unit according to the present invention can distinguish not only down-scaled images using a plurality of clocks having different cycles, but also down-scaled images using valid flags included in clocks having the same cycle.

FIG. 4 is a diagram showing a method by which the real-time face detection apparatus creates a local binary pattern for an input image according to the present invention.

In the case shown in FIG. 4, the value of a center pixel is 6. Eight pixels arranged in a clock direction from a pixel left to the center pixel have values 7, 6, 5, 2, 1, 7, 8, and 9. Here, referring to Equation 1, the pixels arranged in a clock direction from a pixel left to the center pixel have values 1, 1, 0, 0, 0, 1, and 1.

The values acquired as described above are successively recognized as 8-bit code "11000111," and the 8-bit code has a value 241 expressed in the decimal system. In this way, the local binary pattern creation unit 120 can control the brightness of the center pixel based on the brightness value of the center pixel and the brightness values of pixels neighboring the center pixel.

This task corresponds to a kind of filtering task which allows the brightness of neighboring pixels to be incorporated into the brightness of the center pixel.

Figure 5:
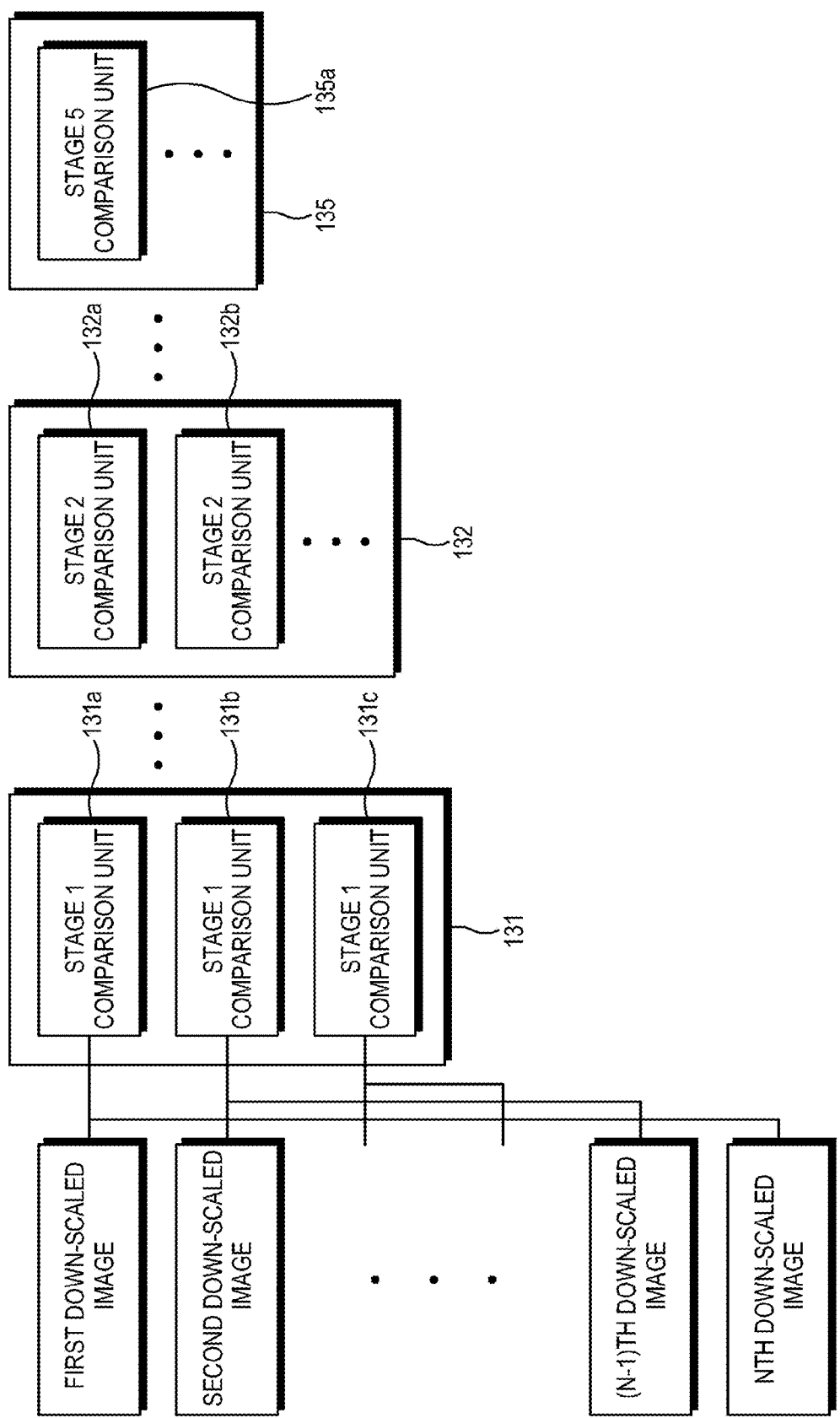
FIG. 5 is a diagram showing a first method by which the real-time face detection apparatus compares down-scaled images with a reference image according to the present invention.

FIG. 5 is a diagram showing a first method by which the real-time face detection apparatus compares down-scaled images with a reference image according to the present invention.

The image down-scaling unit 110 according to the present invention creates a plurality of down-scaled images according to the method described with reference to FIG. 2 or 3. The down-scaled images include a first down-scaled image, a second down-scaled image, . . . , an (n−1)th down-scaled image, and an nth down-scaled image.

Referring to FIG. 2, the first down-scaled image is a down-scaled image having a clock of 0.95 cycle, the second down-scaled image is a down-scaled image having a clock of 0.90 cycle, . . . , the (n−1)th down-scaled image is a down-scaled image having a clock of 0.10 cycle, and the nth down-scaled image is a down-scaled image having a clock of 0.05 cycle.

From FIG. 3, it can be seen that the first down-scaled image is a down-scaled image having 19 valid flags in 20 intervals, the second down-scaled image is a down-scaled image having 18 valid flags in 20 intervals, the (n−1)th down-scaled image is a down-scaled image having 2 valid flags in 20 intervals, and the nth down-scaled image is a down-scaled image having 1 valid flag in 20 intervals.

The down-scaled images created as described above are input to stage 1 comparison units 131 which are arranged in parallel. Each of the stage 1 comparison units 131 according to the present invention may receive at least two down-scaled images and process the received down-scaled images in parallel.

For example, in FIG. 5, a stage 1 comparison unit 131a receives the first down-scaled image and the nth down-scaled image, and compares each of the received down-scaled images with a classifier, that is, a reference image.

As described above with reference to FIG. 2, in order to process the first down-scaled image (the down-scaled image having a clock of 0.95 cycle), a period of 0.95 cycle is necessary. In order to process the nth down-scaled image (the down-scaled image having a clock of 0.05 cycle), a period of 0.05 cycle is necessary.

Accordingly, the stage 1 comparison unit 131a is configured to process the first down-scaled image during 0.95 cycle in 1.00 cycle in which one original image can be processed and to process the nth down-scaled image during the remaining partial clock cycle.

In the case where the down-scaled images shown in FIG. 3 are received, a stage 1 comparison unit 131b receives the second down-scaled image (the down-scaled image having 18 valid flags) and the (n−1)th down-scaled image (the downscaled image having two valid flags). The stage 1 comparison unit 131b capable of processing 20 valid flags processes the second down-scaled image having 18 valid flags during a partial cycle of one clock cycle and processes the (n−1)th down-scaled image having two valid flags during the remaining partial clock cycle.

If, as a result of the comparison, down-scaled images are determined to have a face region confidence (the sum of confidence values corresponding to pixels values for respective pixels) which satisfies a criterion, for example, the face region confidence is equal to or more than a reference value (or equal to or less than the reference value), the stage 1 comparison units 131 transfer the down-scaled images to stage 2 comparison units 132, that is, a subsequent stage.

However, if, as a result of the comparison, down-scaled images are determined to have the face region confidence which does not satisfy the criterion, for example, the face region confidence is equal to or less than the reference value (or equal to or more than the reference value), the stage 1 comparison units 131 determine that the down-scaled images are not face regions and do not transfer the down-scaled images to a subsequent stage.

At stage 2, the face confidence of the received down-scaled images is evaluated using a look-up table having more information than that at stage 1. In the same manner, stage 2 comparison units 132 determine whether to transfer the down-scaled images to a subsequent stage depending on a face region confidence and a reference value or a criterion.

Finally, the down-scaled images of a window which has been transferred to a stage 5 comparison unit 135 are determined to be face regions.

In this case, the face detection unit 140 shown in FIG. 1 determines only one of a plurality of similar windows, which has been determined to be located in an adjacent area and to be face regions, to be a face region. Here, the face detection unit 140 may determine a window, having the greatest (or smallest) sum of face region confidences at all stages, to be a final face region.

Figure 6:
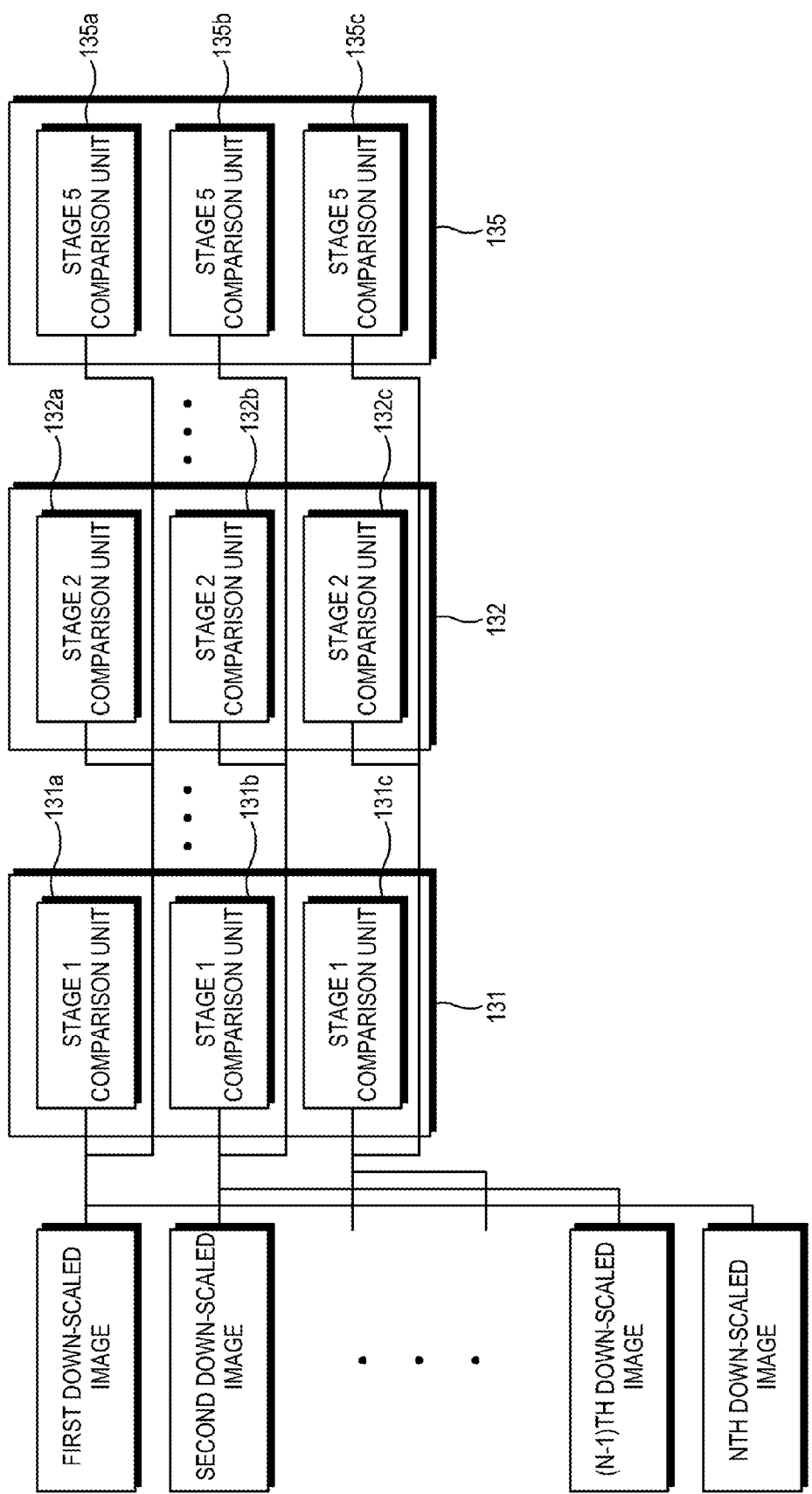
FIG. 6 is a diagram showing a second method by which the real-time face detection apparatus compares down-scaled images with a reference image according to the present invention.

FIG. 6 is a diagram showing a second method by which the real-time face detection apparatus compares down-scaled images with a reference image according to the present invention.

In the case where the tree method based on a plurality of stages shown in FIG. 5 is used, comparison units corresponding to a higher stage further require multiplexers (MUXs) for selecting face candidate areas, that is, calculation targets.

In this case, a problem arises in that the comparison units at a higher stage have a complicated construction. In order to implement a simpler real-time face detection apparatus, the present invention also provides an embodiment in which the tree method is not used.

As shown in FIG. 6, a first down-scaled image and an nth down-scaled image are input to a stage 1 comparison unit 131a, a stage 2 comparison unit 132a, . . . , and a stage 5 comparison unit 135a in parallel.

In the same manner, a second down-scaled image and an (n−1)th down-scaled image are also input to a stage 1 comparison unit 131b, a stage 2 comparison unit 132b, . . . , and a stage 5 comparison unit 135b in parallel.

Each of the stage comparison units may determine whether two down-scaled images are face regions during a received one clock cycle (or during a specific clock cycle).

Although the number of comparison units at a higher stage slightly increases, the construction of each of the comparison units is more simplified. In this case, a real-time face detection apparatus having a simpler construction can be implemented.

Figure 7:
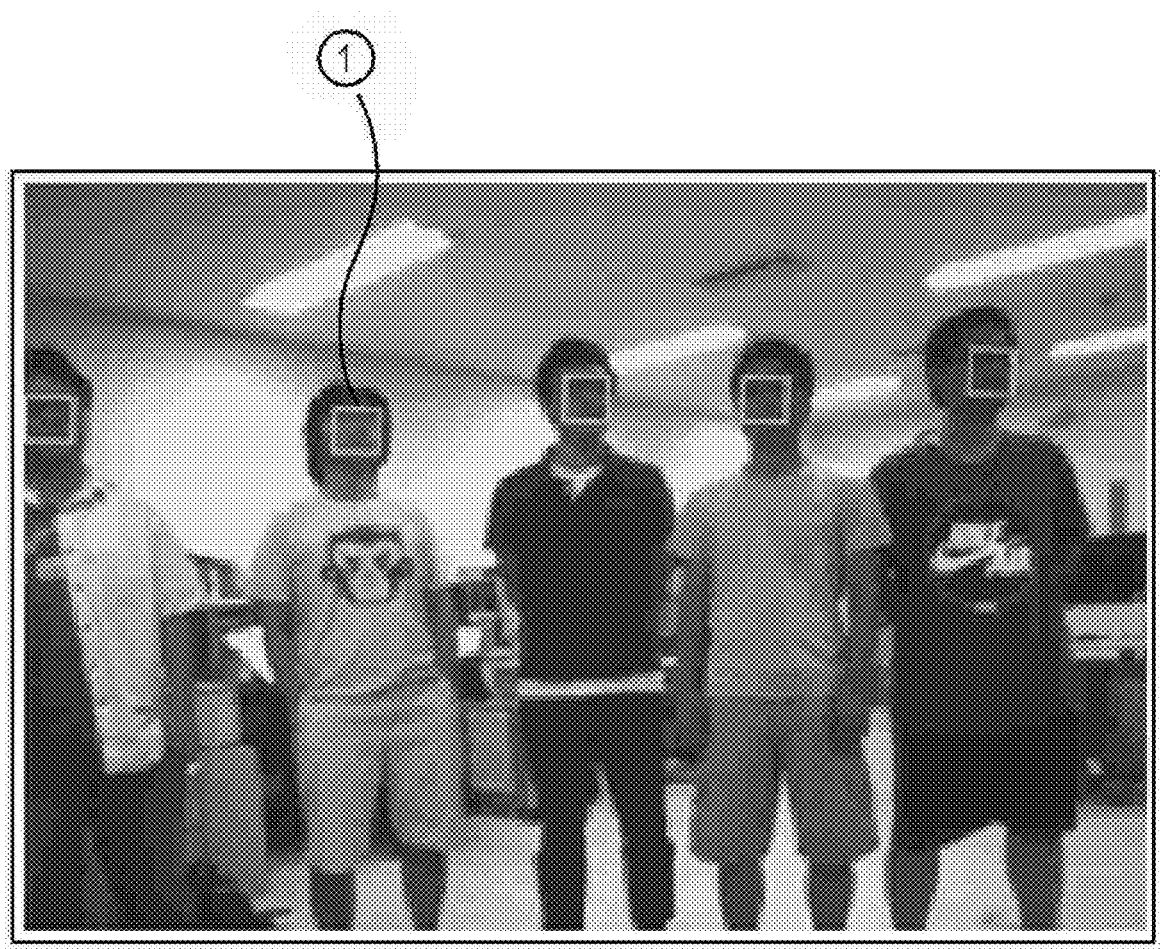
FIG. 7 is a diagram showing the results of detecting face regions in an input image using the real-time face detection apparatus according to the present invention.

FIG. 7 is a diagram showing the results of detecting face regions in an input image using the real-time face detection apparatus according to the present invention.

A plurality of areas which is determined to be face regions is present in the image captured at a 20×20 window size. For example, there is the high probability of all windows, including face ①, being determined to be face region. Here, the face detection unit 140 according to the present invention selects windows having the greatest sum (or the smallest sum) of face region confidence values in each of stages, which belong to windows determined to be faces around the faces ①, as the final face regions.

FIG. 7 illustrates 20×20 windows that are finally selected by the real-time face detection apparatus according to the present invention and are then marked. It can be seen that a total of five face regions have been detected.

As described above, in accordance with the real-time face detection apparatus according to the present invention, it is possible to access a plurality of pixels at the same time and perform parallel processing, so that the real-time face detection apparatus according to the present invention can be applied to various application fields using image processing because it can have higher performance for given images than general purpose computers suitable for sequential processing.

As described above, a face detection apparatus and system according to the present invention can be applied to a variety of application fields, such as the summary of moving images, the verification of identity, Human Computer Interface (HCI) image searching, and surveillance systems. In particular, there is an advantage in that the face detection system which is not based on a separate large-scale computer but can be implemented in real time in the form of a single system may be widely used.

Although the preferred embodiment of the present invention have been disclosed for illustrative purposes, those skilled in the art will appreciate that various modifications, additions and substitutions are possible without departing from the scope and spirit of the invention as disclosed in the accompanying claims.

What is claimed is:
1. A real-time face detection apparatus, comprising:
   a down-scaling unit for down-scaling an input image at at least two ratios into at least two down-scaled images; and
   a face region comparison unit for creating a plurality of windows for the at least two down-scaled images, acquiring face region confidence of each of window images within the created windows by comparing each of the window images with a classifier, and determining whether the window image corresponds to a face region,
   wherein the face region comparison unit receives two or more down-scaled images associated with different fractions of one clock cycle, and determines during the clock cycle whether the received two or more down-scaled images have face regions,
   wherein each of the different fractions of the clock cycle is associated with a corresponding one of the two or more down-scaled images based on the down-scale ratio of the down-scaled image, and
   wherein each of the received two or more down-scaled images is processed within the fraction of the clock cycle for each of the down-scaled images.
2. The real-time face detection apparatus as set forth in claim 1, wherein the classifier is implemented using a look-up table, including pixel-based confidence value information for a specific number of pixels which belong to pixels of a window having a specific size.

3. The real-time face detection apparatus as set forth in claim 2, wherein the face region comparison unit acquires the face region confidence of each of the window images by comparing each of the window images with respective classifiers at a plurality of stages.

4. The real-time face detection apparatus as set forth in claim 3, wherein if a sum of confidence values of pixels of each of the window images, information of which exists in a look-up table, satisfies a preset criterion, the face region comparison unit proceeds to a subsequent stage.

5. The real-time face detection apparatus as set forth in claim 4, wherein if a sum of confidence values of pixels of the window image, information of which exists in a look-up table at a final stage, satisfies a preset criterion, the face region comparison unit determines the window image to be a face region.

6. The real-time face detection apparatus as set forth in claim 5, wherein as the face region comparison unit proceeds to a higher stage, the look-up table includes pixel-based confidence value information for a larger number of pixels which belong to pixels of the window image.

7. The real-time face detection apparatus as set forth in claim 6, further comprising a face detection unit for detecting one of the plurality of window images, which are determined to be the face regions by the face region comparison unit, as a final face region window image.

8. The real-time face detection apparatus as set forth in claim 7, wherein the face detection unit calculates a sum of confidence values of each of the window images, which are determined to be the face regions, at the respective stages, and then detects the final face region window image using the calculated sum.

9. The real-time face detection apparatus as set forth in claim 1, wherein the face region comparison unit determines whether two or more down-scaled images for which a sum of downscaled ratios is 1 are face regions.

10. A real-time face detection apparatus, comprising:
a down-scaling unit for down-scaling an input image at at least two ratios into at least two down-scaled images; and
a face region comparison unit for creating a plurality of windows for the at least two down-scaled images, acquiring face region confidence of each of window images within the created windows by comparing each of the window images with a classifier, and determining whether the window image corresponds to a face region,
wherein the face region comparison unit receives two or more down-scaled images having valid flags, each of the valid flags being associated with each of intervals within one clock cycle, and determines during the clock cycle whether the received two or more down-scaled images are face regions,
wherein the number of the valid flags is associated with the down-scaled image based on the down-scale ratio of the down-scaled image, and
wherein each of the received two or more down-scaled images is processed during the respective intervals associated with the valid flags for each of the down-scaled images.

* * * * *